LEVEL CONTROL FOR PRESS BRAKES AND THE LIKE

Original Filed Jan. 21, 1959 3 Sheets-Sheet 1

INVENTORS.
MERRILL W. HAZELTON,
RICHARD E. GRIESHEIMER
BY AND CARL J. OSTENDORF.
Allen & Allen
ATTORNEYS.

LEVEL CONTROL FOR PRESS BRAKES AND THE LIKE

Original Filed Jan. 21, 1959 3 Sheets-Sheet 2

INVENTORS.
MERRILL W. HAZELTON,
RICHARD E. GRIESHEIMER
AND CARL J. OSTENDORF.
BY Allen & Allen
ATTORNEYS.

LEVEL CONTROL FOR PRESS BRAKES AND THE LIKE
Original Filed Jan. 21, 1959 3 Sheets-Sheet 3
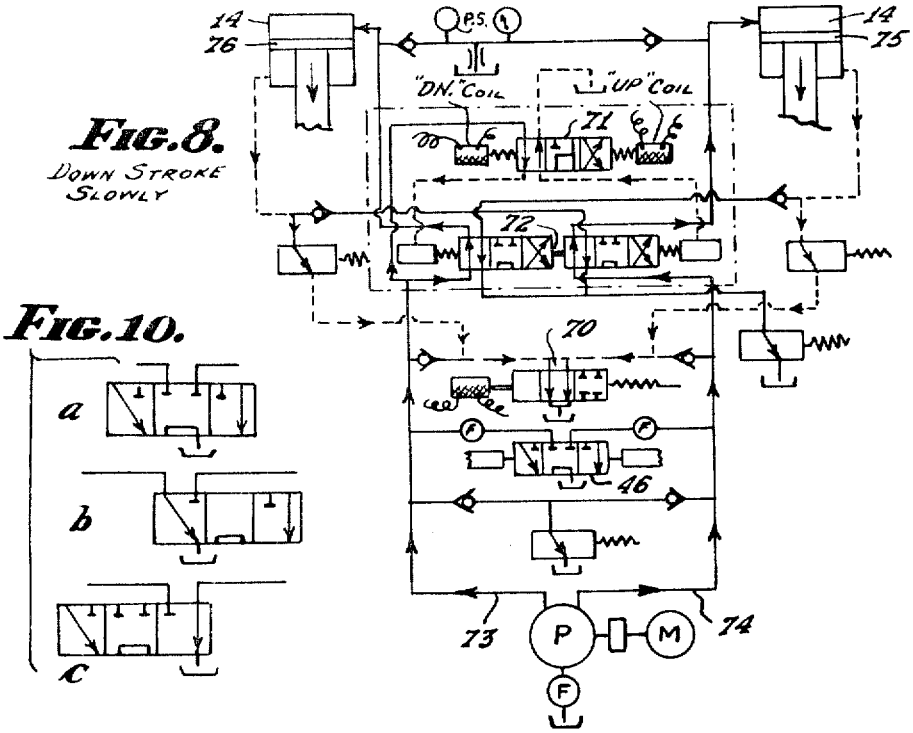
FIG. 8.
DOWN STROKE SLOWLY
FIG. 10.
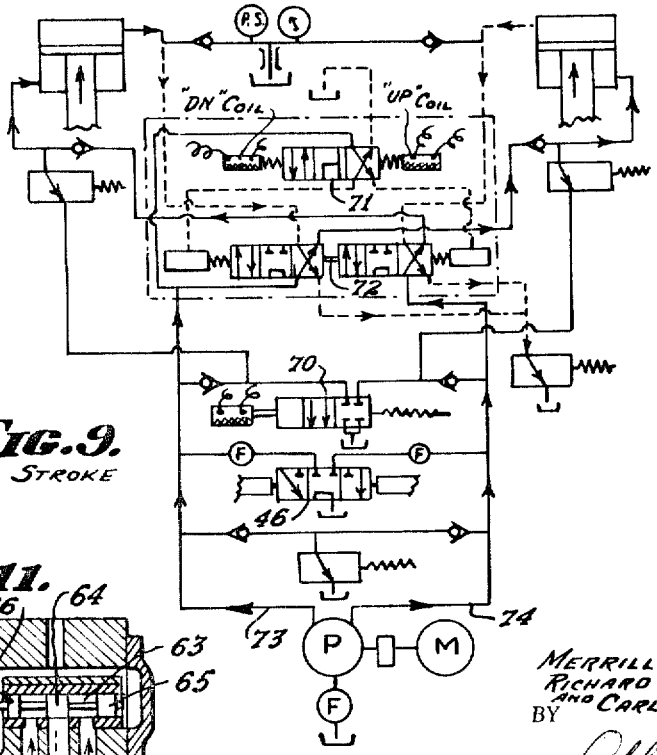
FIG. 9.
UP STROKE
FIG. 11.
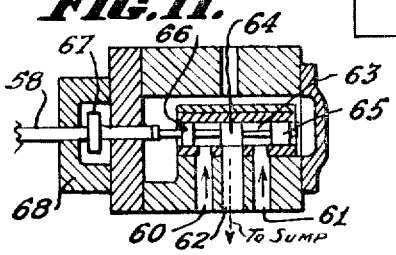
INVENTORS.
MERRILL W. HAZELTON,
RICHARD E. GRIESHEIMER
AND CARL J. OSTENDORF.
BY
ATTORNEYS.

United States Patent Office

Re. 26,236
Reissued July 18, 1967

26,236
LEVEL CONTROL FOR PRESS BRAKES AND THE LIKE

Merrill Hazelton, Richard E. Griesheimer, and Carl J. Ostendorf, Cincinnati, Ohio, by Cincinnati Shapes Company, Cincinnati, Ohio, a corporation of Ohio, assignee Original No. 2,978,976, dated Apr. 11, 1961, Ser. No. 788,184, Jan. 21, 1959. Application for reissue, Aug. 5, 1966, Ser. No. 579,794
9 Claims. (Cl. 100—46)

Matter enclosed in heavy brackets [ ] appears in the original patent but forms no part of this reissue specification; matter printed in italics indicates the additions made by reissue.

This invention relates to a level control for press brakes and the like. Particularly in the case of hydraulic press brakes where the ram is actuated by pistons in a pair of cylinders disposed at opposite ends of the ram, there is a possibility that the two ends of the ram may not descend at exactly the same rate whereby the ram may get out of parallelism with the bed.

Furthermore, it is sometimes desirable in a press brake to deliberately set the ram at an angle with respect to the bed but having so offset the ram the problem of maintaining the ram in its exact offset position, with the two ends thereof descending at exactly the same rate, still remains.

In a shear, which in many respects is similar to a press brake, the knife is usually disposed at an angle known as the rake. The angle of rake should be relatively small for minimum distortion of the work, but on the other hand a relatively large angle of rake increases the capacity of the shear. The general practice in a shear is to provide a fixed angle of rake which is a compromise between maximum capacity and minimum distortion. By the use of the present invention in connection with a shear, it is possible to adjust the rake, and maintain it in adjusted position, as desired.

Various devices and arrangements have been proposed in the past for maintaining the level of a press brake ram and it is the object of the present invention to provide an improved apparatus for controlling and maintaining the level of the ram or the movement of the two ends thereof at the same rate during the operating stroke.

It is an ancillary object of the invention to provide simple means whereby the ram may be set out of level by a desired amount without disrupting the level control mechanism so that the level control mechanism will maintain the oriented position of the ram whether the ram is level or deliberately adjusted out of level.

It is a further object of the invention to provide a control which will be extraordinarily sensitive and quick acting whereby the level of the ram is substantially continuously maintained.

A still further object of the invention is to provide a safety arrangement so that an excessive out of level condition will not damage the machine proper or the level control.

Various other objects of the invention will be disclosed hereinafter or will become apparent as the description of the apparatus proceeds. These various objects are accomplished by that certain construction and arrangement of parts of which the following discloses an exemplary embodiment.

Reference is made to the drawings forming a part hereof and in which:

FIGURE 8 is a hydraulic diagram showing the position of the elements during down movement of the ram.

FIGURE 9 is a similar diagram showing the position of the elements during upward movement of the ram.

FIGURE 10 is a series of diagrams showing the various positions of the level control valve.

FIGURE 11 is a cross-sectional view showing the mechanical details of a suitable level control valve.

Figure 1:
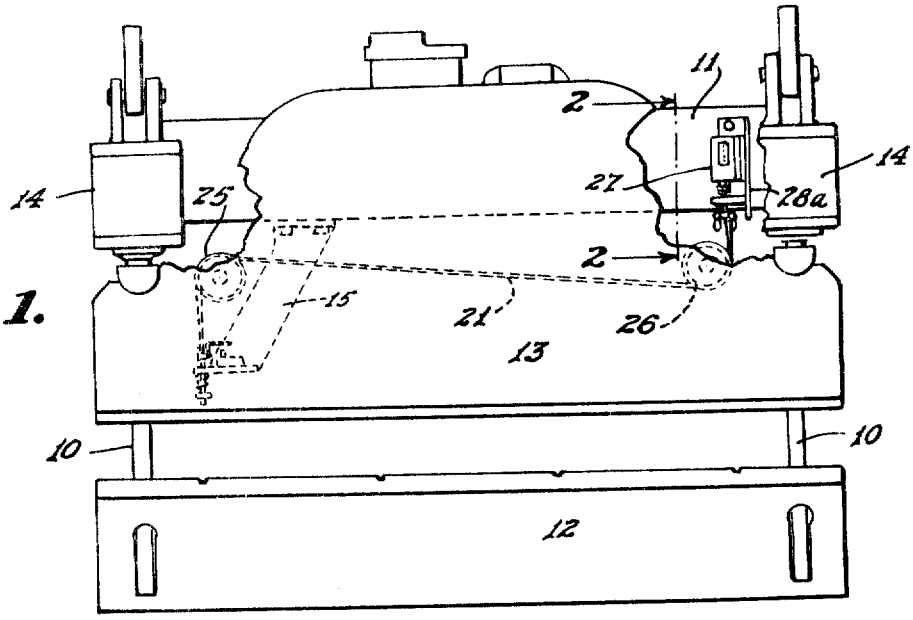
FIGURE 1 is a front elevational view with parts broken away of a hydraulic press brake equipped according to the invention.
Figure 2:
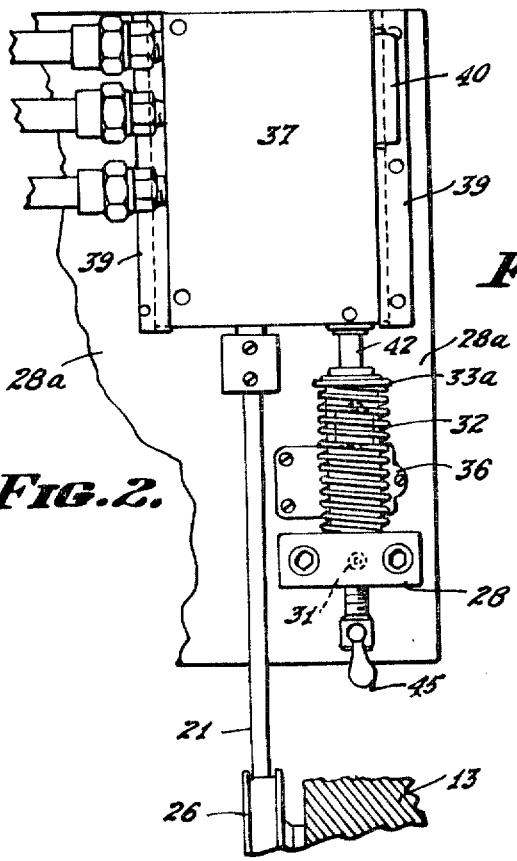
FIGURE 2 is a fragmentary cross-sectional view on an enlarged scale taken on the line 2—2 of FIGURE 1.

The press brake to which this invention may be applied may be of a type disclosed in the copending application of Merrill W. Hazelton, Serial No. 784,551, filed January 2, 1959, *now abandoned*. The control circuits for the press brake may also include stop mechanisms for the ram as well as cam devices for controlling speed of the ram. Such features are disclosed in the copending application of Merrill W. Hazelton and Carl J. Ostendorf, Serial No. 784,449, filed January 2, 1959, *now U.S. Patent No. 3,041,963*, and although some of such features are shown in the electrical and hydraulic diagrams of the present application, they will not be described in detail and for a fuller understanding of these circuits, reference is made to the last mentioned copending application.

The press brake will have a frame which may comprise the side plates 10 and a cross member 11 and a bed 12 may be secured to the frame. A ram 13 is mounted for vertical reciprocating movement with respect to the frame and movement of the ram is accomplished by means of the hydraulic cylinders 14 within which are disposed pistons having piston rods secured to the ram.

Figure 6:
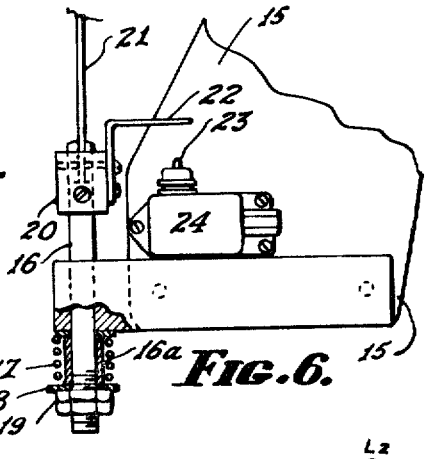
FIGURE 6 is a fragmentary detailed view in the same orientation as FIGURE 1 of the parts shown in broken lines behind the ram at the left of the figure.

Secured to a frame member 11 is a bracket 15 which is disposed just behind the ram, as seen in dotted lines in FIGURE 1 and the lower end of the bracket 15 is shown in more detail in FIGURE 6. The bracket 15 has a bore for the passage of a plunger 16 which is urged downwardly by means of a compression spring 17 operating between a portion of the bracket 15 and a washer 18 held in position by lock nuts 19. A spacer 16a is provided between the washer 18 and the bracket 15. The force at the opposite end of the tape 21 causes the spring 17 to be compressed until the spacer 16a is tight between the washer 18 and the bracket 15. Secured to the plunger 16 at its upper end is a suitable chuck 20 to which is secured one end of a tape 21. The tape 21 may be of any suitable material which has "no stretch" characteristics under the tensile stresses to which the tape will be subjected. Preferably this tape will be of steel.

Also secured to the chuck 20 is an actuating finger 22 in a position to contact the button 23 of a limit switch 24 which is secured to the bracket 15. The function of the limit switch will be described hereinafter.

Mounted on the rear side of the ram are the pulleys 25 and 26. The pulley 25 is mounted in a position such that the tape 21 extends from the chuck 20 vertically to pass over the pulley 25. The tape then passes transversely across the brake and under the pulley 26 and thence vertically to the mechanism indicated in FIGURE 1 generally at 27 and shown in more detail in FIGURES 2 to 5 inclusive.

Secured to a fixed part of the brake, say the cross member 11, as a bracket 28a carrying a member 28 having a bore in which is mounted a sleeve 29. The sleeve 29 is provided with the keyway 30 which engages a key 31 so that the sleeve 29 is non-rotatably but longitudinally slidably located in the bore in the member 28. The sleeve is urged upwardly by the compression spring 32 which bears at its lower end against the member 28 and at its upper end against a member 33 held in position by a retaining ring or the like 34 and having an extension 33a adapted to engage the actuating button 35 of a limit switch 36 secured to the cross member 11 by means of the bracket 28a. The function of the limit switch will be disclosed hereinafter.

Above the parts just described is mounted a structure including a casing 37. The casing 37 is secured to a plate 38 (FIGURE 5) which extends at its edges beyond the casing and engages in the guide members 39 which are secured to the cross member 11 by means of the bracket 28a. In this way the entire casing and its associated parts are vertically slidable with respect to the cross member 11. Within the casing 37 is mounted a counter device 40 having an operating shaft 41.

Figure 3:
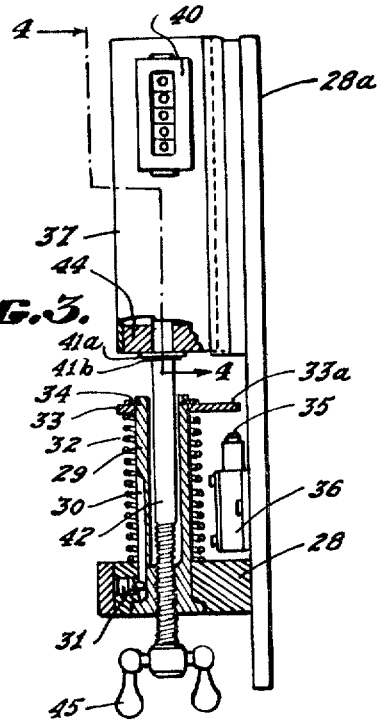
FIGURE 3 is a fragmentary elevational view with parts in section taken from the right hand side of FIGURE 2 or, in other words, in the same orientation as the parts are shown in FIGURE 1.

As shown in FIGURE 3, the sleeve 29 is internally threaded and a threaded shaft 42 passes through the sleeve and is provided with the washer 41a held in position by the retaining ring 41b bearing against the member 44 which constitutes the bottom of the casing 37. At the upper end, the shaft 42 is operatively connected to the aforementioned shaft 41 by a suitable coupling 43.

At its lower end the shaft 42 is provided with a suitable crank or hand wheel 45.

From the foregoing description, it will be understood that the vertical position of the structure 37 can be adjusted by rotating the hand wheel 45 which will cause the entire casing 37 and its associated parts to slide up or down in the ways 39. Since rotation of the hand wheel 45 also actuates the counter 40 which may be calibrated in any sulitable way, the counter 40 will indicate the amount of movement of the casing 37.

Also mounted in the casing 37 is a level control valve generally indicated at 46 which will be described in more detail hereinafter, and the other end of the tape 21 is arranged to actuate the valve 46 as will now be described.

Figure 4:
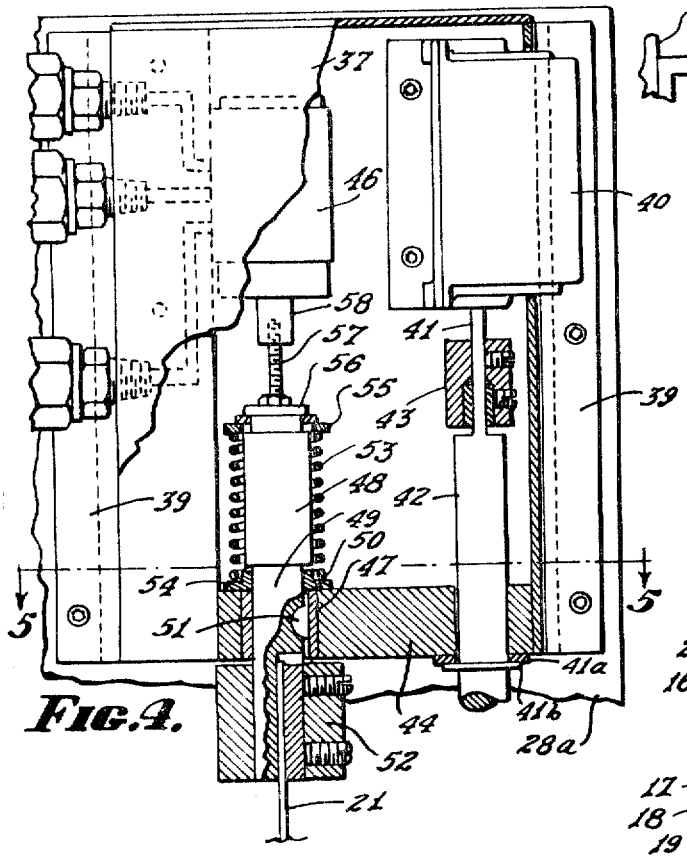
FIGURE 4 is a fragmentary cross-sectional view on a still further enlarged scale taken on the line 4—4 of FIGURE 3.
Figure 5:
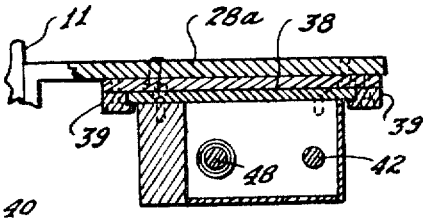
FIGURE 5 is a fragmentary cross-sectional view on a reduced scale taken on the line 5—5 of FIGURE 4.

A bushing 47 in the member 44 provides a slide bearing for a plunger 48 having a reduced portion 49 slidingly engaging in the bushing 47 and having a keyway 50 in engagement with the key 51. In this way the plunger 48 may have vertical sliding movement but non-rotating movement with respect to the member 44. A suitable clamping device indicated generally at 52 is provided to secure the end of the tape 21 to the plunger 48 as best seen in FIGURE 4. The plunger 48 is urged upwardly by a compression spring 53 bearing at its lower end against the collar 54 and at its upper end against a washer 55 disposed in the necked portion 56 of the plunger 48, with sufficient force to overcome the spring 16a at the opposite end of the tape 21. A connection 57 is provided between the upper end of the plunger 48 and the actuating element 58 of the valve 46. The reduced diameter of the portion 49 with respect to the body of the plunger at 48 constitutes a shoulder to abut against the collar 54 to limit downward movement of the plunger. The clamping member 52 abuts against the element 44 to limit upward movement of the plunger 48 and as best seen in FIGURE 4 the permissible amount of movement is very small. As will be pointed out hereinafter, it takes only a minute amount of movement to operate the valve 46.

From the foregoing description, it will be understood that as the ram moves upward or downward assuming that it remains in abloslute parallelism, there will be movement of the tape 21 with respect to the pulleys 25 and 26 but that these movements exactly compensate each other so that there is no relative movement between the ends of the tape and the elements to which they are fastened. If, however, the right-hand end of the ram, as seen in FIGURE 1, should move faster and advance beyond the left-hand end of the ram, it will be clear that the tape 21 at the right-hand end of the apparatus will be pulled downwardly. This will pull the actuating element 58 downwardly in FIGURE 4 to operate the level control valve in one direction. The downward pull is of course against the effort of the spring 53.

If the left-hand end of the ram should advance ahead of the right-hand end, the right-hand end of the tape 21 will move upwardly and therefore the spring 53 will pull the plunger 48 upwardly, thereby moving the actuating element 58 of the valve 46 upwardly. The movements just described actuate the level control valve 46 in one direction or the other.

Turning now to FIGURES 10 and 11, the diagram of FIGURE 10 illustrates the three positions of the level control valve. Diagram a shows the neutral position in which the two pressure lines at the top of the figure are blocked. Diagram b illustrates the situation when the valve is thrown in one direction and the left-hand pressure is connected to the sump. In diagram c the valve is moved in the opposite direction and the right-hand pressure line is connected to the sump. The basic principle upon which this invention operates is that when one end of the ram moves in advance of the other sufficiently to actuate the level control valve, the valve is moved to a position to bleed pressure from that cylinder which is pushing its piston ahead of the other. This then permits the other piston to catch up.

Referring to FIGURE 11, a suitable valve is there indicated. It will be seen that there are the intake ports 60 and 61 and an exhaust port 62 connecting to the sump. These ports all communicate with a cylindrical passage 63. The actuating element 58 of the valve is provided with a valve element 64 which completely obstructs the passage 63 and is of dimensions to just cover the exhaust port 62. Elements 65 and 66 block the passage 63 beyond the two intake ports 60 and 61. From a consideration of FIGURE 11, it will be clear that a minute movement of the element 64 in either direction will put one of the intake ports 60 or 61 into communication with the exhaust port 62. In actual practice, a movement of .0001 inch in either directions is sufficient to operate the level control valve. A washer 67 disposed within the element 68 limits the axial movement of the actuating element 58.

In the event of an extraordinary or excessive out of level orientation of the apparatus in either direction, one or the other of the limit switches 24, 36 will serve to break the electric circuit. If the ram tilts excessively in a clockwise direction, as seen in FIGURE 1, the tape 21 at the right-hand end is pulled down excessively until the plunger 48 engages the member 44 through the collar 54, thus causing the entire casing 37 to move downwardly. As the casing 37 moves downwardly, the sleeve extension 33a and the sleeve 39 are likewise moved downwardly by the engagement of the sleeve 29 with the threaded shaft 42, which in turn is abutted by the member 44 through the washer 41a and retaining ring 41b. This prevents the tape from breaking. In overcoming the compression of the spring 32, the extension 33a will engage the actuating button 35 of the limit switch 36.

Upon excessive counterclockwise disorientation, the band 21 will tend to slacken because the preloaded spring 53 will take up only the clearance provided between the clamping members 52 and the element 44. As the band slackens, or if it should break, the left-hand end of the tape will be pulled down under the force of the spring 17 until the member 22 engages the actuator button 23 of the limit switch 24.

The entire tape is enclosed in a dust-proof casing (not shown) because dust or particles of foreign matter getting between the tape and the pulleys can cause inaccuracy in operation.

Coming now to a consideration of the flow diagrams, FIGURES 8 and 9, FIGURE 8 shows the position of the parts on the downstroke with the speed control valve set for slow movement. The valve indicated generally at 70 is a differential valve which in one position gives high speed and in the other position gives low speed. The valve 71 is a solenoid operated valve which determines whether the ram shall move upward or downward and it accomplishes this by a control of the hydraulic circuits to the main valve 72 which is hydraulically operated to control up or down movement. Hydraulic fluid is pumped by means of a pump P driven by a motor M and it pumps hydraulic fluid from a sump or reservoir through a filter F into the system. The pump P is a split flow type of pump available on the market, which has special balanced features to produce equal flow in two lines. The pump P pumps hydraulic fluid into the two lines 73 and 74 to operate the pistons 75 and 76 in the cylinders 14. For the details of operation of the various valves in the circuit, reference is made to said [copending application Serial No. 784,499] *Patent No. 3,041,963. By reference to said patent it will be noted that the single valve means 72 (actually composed of two separate valves linked together, as clearly shown in FIGURE 8), in switching from down stroke to up stroke, reverses the connections to the pistons 75 and 76, so that one side of the split flow pump P will serve the piston 75 on the down stroke and the piston 76 on the up stroke. The other side of the pump will conversely serve the pistons 75 and 76. As a result of this arrangement, if, say, the piston 75 tends to lead on the down stroke, the piston 76 would tend to lead on the up stroke. Thus the lead piston on both strokes is served by the same side of the split flow pump P. This prevents lead errors between the pistons from accumulating, and enables the valve 46 always to bleed fluid from behind that piston which is ahead (i.e. the pressure side of that piston) regardless of the direction of the stroke. The above described arrangement of the valve 72 eliminates the need for an additional valve to accomplish this purpose.*

If the right-hand end of the ram moves ahead of the left-hand end of the ram, the valve 46 is actuated to move to the position of FIGURE 10c so as to bleed some of the fluid from the line 74 and thereby reduce the rate of flow behind the piston 75. If the left-hand end of the ram gets ahead of the right-hand end, the tape will move the valve 46 to the position of FIGURE 10b whereby some of the hydraulic fluid is bled from the line 73 to reduce the rate of flow behind the piston 76. From what has been said before, it will be understood that this bleeding may be accomplished with a movement of the valve plunger 58 of only .0001 inch so that the adjustment is substantially instantaneous at all times and at any part of the stroke of the ram.

To deliberately set the ram 13 at an out of level position with respect to the bed 12 and maintain that position throughout the stroke, the vertical position of the level control valve 46 is shifted by means of a screw 42 and nut 29. Turning the screw in a clockwise direction, as viewed from underneath, moves the casing 37 upwardly. The level control valve 46, being attached to the casing is likewise moved upwardly.

The amount of upward movement is registered on a counter 40 which is directly connected to the screw 42 by means of coupling 43. The counter reading is in .001 inch. The upward movement of the valve 46 registers decreasingly on the counter, that is, 0.000, 9.999, 9.998, and 9.997 to indicate valve movements of .001 inch, .002 inch, and .003 inch, respectively. This upward movement of valve 46 has the same effect on the leveling system as a downward movement of the valve spool element 64. This downward movement (relative) of the valve spool element 64 as described previously, causes the right-hand end of the ram to advance at a slower rate than the left-hand end on the downstroke or the left-hand end advance at a slower rate than the right-hand end on the up stroke until the spool element 64 is centered in the valve 46.

With the spool element 64 centered and the counter set at 9.997 it will be seen that the ram will be tilted by .003 inch as measured along the ram between the vertical portions of the band 21. The right-hand end of the ram will be higher than the left-hand end of the ram with respect to the bed 12.

Conversely with a counterclockwise turning of screw 42, the level control valve 46 will be moved downwardly, effecting a relative upward movement of the spool member 64 and the ram will be tilted with the left-hand end high. The counter will read increasingly for increased tilt, that is, 0.000, 0.001, 0.002, and 0.003 respectively to indicate valve movement of .001 inch, .002 inch and .003 inch. When the ram 13 is exactly parallel to the bed 12, and the valve spool member 64 is exactly centered in the valve 46, the counter is set to read 0.000.

FIGURE 9 shows the relation of the parts on the up stroke and it will be seen that the same considerations apply and that the valve 46 will again bleed hydraulic fluid from behind that piston which is ahead in its upward travel.

It will also be understood from the description above that the ram may be set deliberately out of level to a desired degree and that once so set it will be maintained accurately in the out of level condition to which it has been adjusted.

Figure 7:
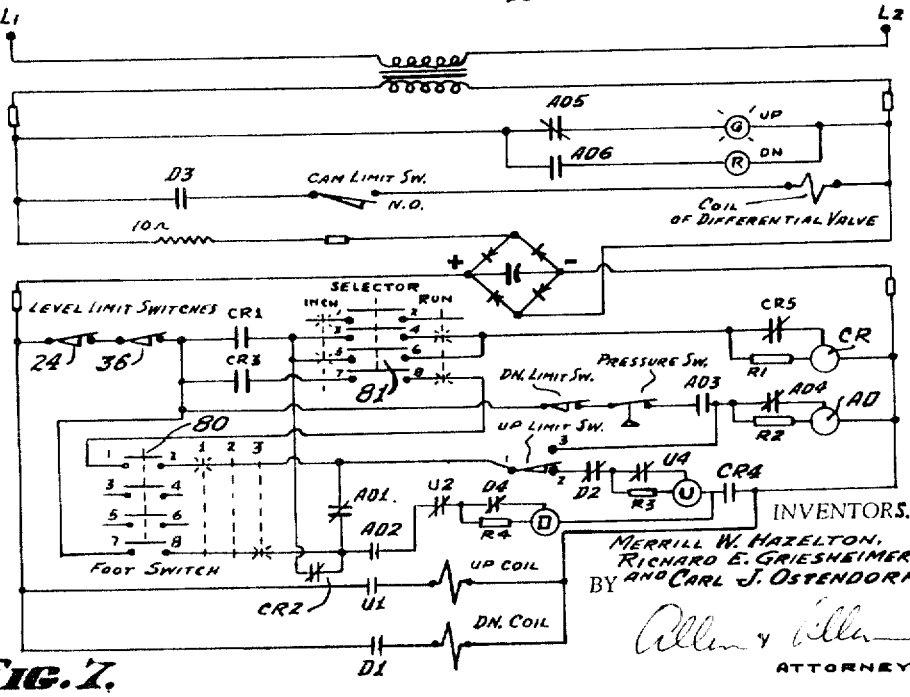
FIGURE 7 is a wiring diagram showing the electric circuit involved.

Turning now to the electrical diagram of FIGURE 7, this again shows parts which do not constitute a part of the present invention and which are more fully described in said [copending application Serial No. 784,499] *Patent No. 3,041,963.* A foot switch for operating the brake is shown generally at 80 and a selector switch is shown generally at 81. Both of these switches are diagrammatically shown. The selector switch 81 has two positions, one indicated as "run" and the other as "inch." The star symbols indicate which contacts are closed in each of the positions. Similarly, the foot switch has three positions, 1, 2 and 3, and the stars again indicate which contacts are closed in each position. The limit switches 24 and 36 are shown in this diagram as being in series with each other and with the control relay CR1, so that the opening of either of these limit switches breaks the circuit as does the opening of the control relay CR. The diagram of FIGURE 7 is substantially the same as that in the said [copending application Serial No. 784,499] *Patent No. 3,041,963,* except that the limit switches 24 and 36 are shown. For an understanding of the remaining parts of the diagram and their function, reference is made to the said [copending application] *patent.*

It will be clear from the foregoing description that a relatively simple level control apparatus has been provided which has an extraordinarily rapid response so that orientation of the ram can be maintained more accurately than has been possible with level control devices known heretofore.

It will be clear that various modifications may be made without departing from the spirit of the invention and no limitation not specifically set forth in the claims is intended.

What is claimed is:

1. In a hydraulic press brake and the like having a frame and a bed, and having a pair of hydraulic cylinders equipped with pistons, and a ram connected to said pistons for actuation thereby, *a pump and a hydraulic circuit for feeding fluid under pressure to said cylinders above said pistons for a downstroke, and below said pistons for an up stroke, said hydraulic circuit including a single valve means for switching said fluid flow from above said pistons to below said pistons, and concurrently for reversing the flow to said two cylinders, so that the pressure line to one of said cylinders on the down stroke becomes the pressure line to the other of said cylinders on the up stroke, and vice versa, and* a ram level control mechanism comprising means to detect continuously which of said pistons is in advance of its proper position in either direction of movement thereof, means to bleed hydraulic fluid from the pressure side of the cylinder of said advanced piston at a rate which is proportional to the lead error of said advanced piston, and a continuously operative connection between said detecting means and said bleeding means.

2. Apparatus according to claim 1, wherein said bleeding means comprises a valve having an exhaust opening and two intake openings, one of said intake openings being connected to the pressure side of one of said cylinders and the other intake opening being connected to the pressure side of the other of said cylinders, means normally closing said exhaust opening, said last named means being movable to connect said exhaust opening with one or the other of said intake openings.

3. Apparatus according to claim 2, wherein said exhaust opening is centrally exposed relative to said intake openings and all of said openings communicate with a common passage, and wherein said closing means is of a congfiuration to obstruct completely said passage and to just close said exhaust opening, whereby upon the slightest movement of said closing means from a position in which it closes said exhaust opening, it places said exhaust opening in connection with one or the other intake opening.

4. Apparatus according to claim 1, wherein said detecting means comprises a flexible tape of non-stretch material, said tape being secured at one end to said frame adjacent one end of said ram, a pair of pulleys mounted on said ram, one adjacent each end thereof, said tape passing from said secured end vertically and over one of said pulleys, thence toward the other end of said ram and under the other one of said pulleys, thence vertically, and secured at its other end, to said bleeding means, said bleeding means being secured to said frame, whereby a differential movement of the ends of said ram produces a relative movement between the said other end of said tape and said frame.

5. Apparatus according to claim 4, wherein said bleeding means is mounted on said frame for vertical adjustment, whereby said ram may be caused to travel in an attitude which is out of parallel with respect to the bed, which non-parallel attitude is then maintained by said level control.

6. Apparatus according to claim 4, wherein said bleeding means is mounted upon a carrier, said carrier being vertically slidably mounted on said frame, means restricting relative movement between said tape and carrier, screw means for adjusting the vertical position of said carrier, and an indicator connector to said screw means to indicate the position of adjustment of said carriage.

7. Apparatus according to claim 4, wherein said bleeding means is mounted upon a carrier, said carrier being vertically slidably mounted on said frame, means restricting relative movement between said tape and carrier, screw means for adjusting the vertical position of said carrier, spring means urging said carrier upwardly, and a limit switch adapted to be actuated by downward movement of said carrier against the effort of said spring means.

8. Apparatus according to claim 4, wherein said bleeding means is mounted upon a carrier, said carrier being vertically slidably mounted on said frame, means restricting relative movement between said tape and carrier, screw means for adjusting the vertical position of said carrier, an indicator connected to said screw means to indicate the position of adjustment of said carrier, a spring means urging said carrier upwardly, and a limit switch adapted to be actuated by downward movement of said carrier against the effort of said spring means.

9. Apparatus according to claim 4, wherein said bleeding means is spring connected to said frame and has associated with it a limit switch actuator, a limit switch mounted on said frame in a position to be actuated by said actuator upon excessive lead error of one piston, and a limit switch mounted on said frame adjacent said one end of said tape, said one end of said tape having a limit switch actuator adapted to actuate said last named limit switch upon excessive lead error of the other piston, both ends of said tape being spring loaded with respect to said actuators whereby most lead errors are instantaneously corrected by said bleeding means, and whereby under excessive lead errors said spring loading is overcome in one direction or the other to permit said actuators to actuate the respective limit switches.

References Cited

The following references, cited by the Examiner, are of record in the patented file of this patent or the original patent.

UNITED STATES PATENTS

| | | | |
|---|---|---|---|
| 2,271,231 | 1/1942 | Platt et al. | 15—250.27 |
| 2,309,944 | 2/1943 | Flowers | 100—258 |
| 2,353,389 | 7/1944 | Cannon | 100—258 |
| 2,484,908 | 10/1949 | Purcell | 100—258 |
| 2,558,071 | 6/1951 | Castle et al. | 100—258 |
| 2,759,330 | 8/1956 | Van Broekhoven et al. | 100—46 X |
| 2,761,285 | 9/1956 | Beecroft | 100—258 X |
| 2,764,869 | 10/1956 | Scheer | 91—171 |

FOREIGN PATENTS

| | | |
|---|---|---|
| 554,000 | 3/1958 | Canada. |
| 671,547 | 5/1952 | Great Britain. |

BILLY J. WILHITE, *Primary Examiner.*

ABRAHAM G. STONE, *Examiner.*